United States Patent [19]
Reynard

[11] Patent Number: 5,839,864
[45] Date of Patent: Nov. 24, 1998

[54] LOCKING SYSTEM FOR CONTAINER-CARRYING TRAILER

[76] Inventor: Stephen Kenneth Reynard, 17 Uanum Avenue, Sowerby, Thirsk, Y07 1RU, England

[21] Appl. No.: 815,930

[22] Filed: Mar. 13, 1997

[30]    Foreign Application Priority Data

Mar. 15, 1996 [GB] United Kingdom ............... 9605532

[51] Int. Cl.⁶ ................................................ B60P 7/08
[52] U.S. Cl. ........................... 410/69; 410/70; 410/76; 410/77
[58] Field of Search ............................ 410/69, 70, 71, 410/76, 77, 80, 81, 82; 292/163, 165, 169, 173, 140

[56]    References Cited

U.S. PATENT DOCUMENTS

| | | | |
|---|---|---|---|
| 3,399,921 | 9/1968 | Trost et al. ................................ | 410/69 |
| 3,431,017 | 3/1969 | Joseph ....................................... | 410/80 |
| 4,352,517 | 10/1982 | Bertolini ................................ | 410/76 X |
| 5,575,599 | 11/1996 | Conlee et al. ............................ | 410/69 |

FOREIGN PATENT DOCUMENTS

| | | |
|---|---|---|
| 2 131 078 | 6/1984 | United Kingdom . |
| WO 96/00180 | 1/1996 | WIPO . |

*Primary Examiner*—Stephen T. Gordon
*Attorney, Agent, or Firm*—Workman, Nydegger & Seeley

[57]    ABSTRACT

A locking system for a container-carrying trailer vehicle (10) having a loading platform (13) on which container (14) can be mounted, in which the locking system comprises a forward pair of locking devices (16) and a rearward pair of locking devices (17) mounted at forward and rear ends of the loading platform, and which co-operate with respective corner fittings (15) of the container (14) in order to clamp the container to the loading platform, in which each locking device (17) of the forward pair comprises: a housing (18), a bolt (20) mounted in the housing (18) to move linearly between an extended locking position and a withdrawn unlocking position; an actuator (21) coupled with the bolt (20) and operable to move the bolt to the unlocking position when the container is to be unloaded; a latch (24) mounted in the housing (18) to engage the bolt (20) and latch the bolt in the unlocking position; a torsion spring (22) biasing the bolt (20) to the locking position; a cam arrangement (26) mounted in the housing (18) and moveable between an actuatable position in which it projects from the housing (18) and into the loading space 50 as to be in the path of loading movement of the container (14), and an at least partly withdrawn position to which it is moved when engaged during the loading movement of the container; and an operative interconnection between the cam arrangement (26) and the latch (24) which can disengage the latch from the bolt (20) and allow the bolt to move under its biasing to the locking position when the cam arrangement is moved to its withdrawn position by the loading movement of the container.

7 Claims, 5 Drawing Sheets

LOCKING SYSTEM FOR CONTAINER-CARRYING TRAILER

This invention relates to a locking system for use with a freight container having corner fittings, said system being adapted to be mounted on a loading platform and to be operable in order to co-operate with the corner fittings and thereby to clamp the container to the loading platform.

BACKGROUND TO INVENTION

The use of corner fittings on freight containers e.g. marine containers, is well-known, and the loading platform on which a freight container can be mounted can be the base of a railcar, the deck or hold of a ship, a vehicle trailer platform, a load carrying platform of a lorry, or the top of an underlying freight container on which it is stacked.

However, the present invention is primarily concerned with a locking system which is intended to be provided on a loading platform of a trailer vehicle of a type which is adapted to be mounted on, and towed behind a tractor unit via a fifth wheel or other coupling.

Trailer vehicles have been used to transport marine shipping containers on the public highway for many years, and the locking systems used to clamp the containers to the loading platforms must be reliable, robust and easy to operate. The loading system has to be sufficiently robust to withstand shear forces, and also tensile forces which are generated inevitably as a consequence of high speed travel on the public highway.

Generally, locking devices in the form of so-called "twistloks" are provided at each corner of the loading platform, and each of which co-operates with a respective corner fitting of a container in order to clamp the container to the platform. Alternatively, twistlok type devices can be provided at the corners of the container, and be operated in order to engage with mounting blocks at the corners of the platform.

Twistlok type locking devices are well-known to those of ordinary skill in the art, and need not be described in detail herein. They can be entirely manually operated (between clamping and unclamping positions), or may be semi-automatic in the sense of being automatically operated upon downward movement of a container onto a loading platform, and manually operable in order to release the locking device and allow unloading of the container.

One example of a semi-automatic clamping device is shown in WO96/00180, to which reference is drawn.

In some countries e.g. the United States of America, low bridge heights can be a problem, since very large tractor units are commonly used, and with a usual fifth wheel or other suitable type of trailer mounting and coupling device, this causes the forward end of the trailer which is coupled with the tractor unit to be quite high above the ground. Usually, therefore, the loading platform of the trailer slopes downwardly from its forward end to its rear end, and it is common practice to use twistlok type locking devices at the two opposed corners of the platform at the rear end, and to use "shoot bolt" type locking devices at the opposed corners at the forward end of the platform.

The shoot bolts move linearly and in a rearward and generally horizontal direction so as to pass through the usual front apertures provided in the forward corner fittings of the container, and to hold down the forward end of the container. By use of such shoot bolts, it is possible to achieve a reduction in depth of the trailer support beams provided at the front of the trailer, and thereby to obtain an overall reduction in height of the container when mounted on the platform (it being remembered that the forward end of the container will usually be higher than the rear end when mounted on a trailer vehicle which is towed by a large tractor unit).

Typically, shoot bolts are of oval cross-section, and project into the cast housing of a corner fitting by about 70 mm. The industry accepted standard for such fittings is well known.

Movement of the shoot bolt (locking pin) from the locked position to the unlocked position (and vice versa) can be achieved by a direct manual pulling force, or manually via a lever and pivot arrangement if a mechanical advantage is required.

However, by relying solely upon manual control of the operation, the integrity and reliability of the system becomes heavily dependent upon individual attention (or lack of it) given to the task by the operator of the system, whether for loading or unloading.

In practice, many operators do not bother to effect manual release of the shoot bolts prior to unloading of a container. Instead, the operator merely raises the rear end of the container through a small distance (after releasing the two rear twistlok type locking devices), and then causes the container to be moved rearwardly in a generally horizontal direction (by rearward movement of an overhead crane). This rearward movement continues until the forward container fittings withdraw from engagement with the forward shoot bolts, which are assumed to have been allowed to remain in the extended locking position. Once clear of the shoot bolts, the container can then be raised or lowered, and moved horizontally to a required new storage location.

Similarly, when loading a container onto the trailer (with the shoot bolts remaining in the extended locking position), it is often the case that a crane operator will 1) bring the container to a position above the platform, with the rear corner fittings located slightly rearwardly of the rear twistlok devices on the platform, 2) lower the container to the general level of the platform, 3) move the container forwardly over the platform and 4) simultaneously guide the rear corner fittings into engagement with the rear twistlok devices and slide the forward corner fittings over the extended shoot bolts.

These practices are, of course, contrary to recommended procedure, but are an inevitable consequence in many cases of unsupervised loading and unloading of containers.

Quite clearly, during such unauthorised loading and unloading procedures, the risk of damage being done to the forward shoot bolts is very considerable, since a) lifting of the forward end of the container too soon during unloading or b) during loading downward movement of the forward end of the container after the forward container fittings have been moved too far forward, will result in substantial forces to be exerted on the shoot bolts and transversely of their lengths. This will bend, weaken or in time may eventually cause failure of the shoot bolts, with evident risk to other highway users if a failure occurs during high speed travel or when negotiating bends in a road.

Also, clumsy handling of the container can result in damage being done to the fixed structure of the trailer platform at the forward end. Quite apart from the dangers of premature failure by such mis-use, necessary repair represents "down time" in use of the vehicle and therefore potential loss of haulage revenue, quite apart from the costs of remedying the damage.

The invention therefore seeks to provide an improved locking system for a container-carrying trailer vehicle, and which reduces the risk of damage being done to forward shoot bolts of the locking system during loading or unloading.

SUMMARY OF INVENTION

According to one aspect of invention there is provided a locking system for a container-carrying trailer vehicle, said vehicle having a loading platform on which a container can be mounted and said locking system comprising a locking part formed by a forward pair and a rearward pair of locking devices and a mounting part formed by mounting blocks co-operable each with a respective one of said locking devices, and one of said parts being intended to be mounted on a container and the other of said parts being intended to be mounted on the platform, in which each locking device of the forward pair comprises:

a housing;

a bolt mounted in said housing for linear movement between an extended locking position and a withdrawn unlocking position;

an actuator coupled with the bolt and operable in order to move the bolt from the locking position to the unlocking position when it is required to unload a container from the platform;

a latch mounted in the housing for engagement with the bolt in order to retain the bolt in the unlocking position, when the latter has been withdrawn from its locking position;

means biasing the bolt towards the locking position;

a cam arrangement mounted on the housing and moveable between an actuatable position in which it projects from the housing so as to be in the path of loading movement of a container, and an at least partly withdrawn position relative to the housing to which it is moveable when engaged during the loading movement of the container; and an operative interconnection between the cam arrangement and the latch which is capable of disengaging the latch from the bolt and allowing the bolt to move under its biasing to the locking position when the cam arrangement is moved from its projecting position by the loading movement of the container.

Therefore, the bolt of each pair of forward locking devices can be easily manipulated by the actuator to the unlocking position, and is latched in this position, so that unloading can take place, and the latch remains in the unlocking (withdrawn) position during subsequent loading of another container. The actual loading movement of the new container necessarily brings it into contact with the cam arrangement, now in the projecting position, and the cam arrangement is then moved to its at least partly withdrawn position by this loading movement, thereby causing disengagement of the latch from the bolt and allowing the bolt to move under its biasing to the locking position.

In a preferred arrangement, the locking part i.e. the forward and rear pair of locking devices, will be mounted at suitable corner positions on the loading platform of the trailer vehicle, whereas the mounting blocks will be provided at the corners of the containers, in which case they may take the form of corner fittings well-known per sé. However, it should be understood that it is within the scope of the invention for the positions of the mounting part and the locking part to be reversed.

The locking devices of the rearward pair may take any suitable form, and may comprise manually operated twistlok type locking devices, semi-automatic locking devices, or even entirely automatic locking devices.

The cam arrangement may comprise a cam plate which may be pivotally mounted internally of the housing, and in the preferred arrangement, a pair of cam plates is provided, one located to each side of the locking bolt. The cam plates may be simply suspended from a common upper pivot point, and the cam plates can move partly under gravity, and under the effect of the loading movement of the container so as to take up an at least partly withdrawn position internally of the housing During this movement of the cam plates to the withdrawn position, the operative inter connection between the cam arrangement and the latch effects disengagement of the latch and then allows the bolt to move rearwardly under the action of the spring biasing and into its locking position within the corresponding mounting block e.g. forward corner fitting of the container.

The latch may take simple form e.g. of a latch plate, which is capable effectively of "floating" within a chamber defined within the housing, so as to be moveable between latching and unlatching positions, and also to allow relative longitudinal movement of the bolt to the housing. The latch plate therefore is able to move both up and down, and also longitudinally within the housing, to allow linear movement of the bolt (between its locking and unlocking positions), when required.

The biasing means may take any convenient form, and in one preferred form, the actuator takes the form of a manually operated lever connected to the bolt in such a way that pivotal movement of the lever causes linear movement of the bolt, and the biasing means may comprise, by way of example, a torsion spring mounted on a pivot point of the lever.

According to a further aspect of the invention there is provided a container-carrying trailer vehicle having a loading platform on which can be mounted a container having corner fittings, and a locking system for clamping the container to the loading platform and which comprises a forward pair of locking devices and a rearward pair of locking devices which are mounted at respective forward and rearward ends of the loading platform and each of which is co-operable with a respective corner fitting of the container in order to clamp the container to the loading platform, in which each locking device of the forward pair comprises:

a bolt which is mounted, directly or indirectly at the forward end of the platform so as to be capable of carrying out linear movement between an extended locking position and a withdrawn unlocking position;

an actuator coupled with the bolt and operable in order to move the bolt from the locking position to the unlocking position when it is required to unload a container from the platform;

a latch which is engageable with the bolt in order to retain the bolt in the unlocking position, when the latter has been withdrawn from its locking position;

means biasing the bolt towards the locking position;

a cam arrangement mounted at the front end of the platform so as to be moveable between an actuatable position in which it protects into the loading space so as to lie in the path of loading movement of the container and an at least partly withdrawn position to which it is moveable when engaged during the loading movement of the container; and an operative interconnection between the cam arrangement and the latch which is capable of disengaging the latch from the bolt and allowing the bolt to move under its biasing to the locking position when the cam arrangement is moved from its projecting position by the loading movement of the container.

DESCRIPTION OF PREFERRED EMBODIMENT

Figure 1:
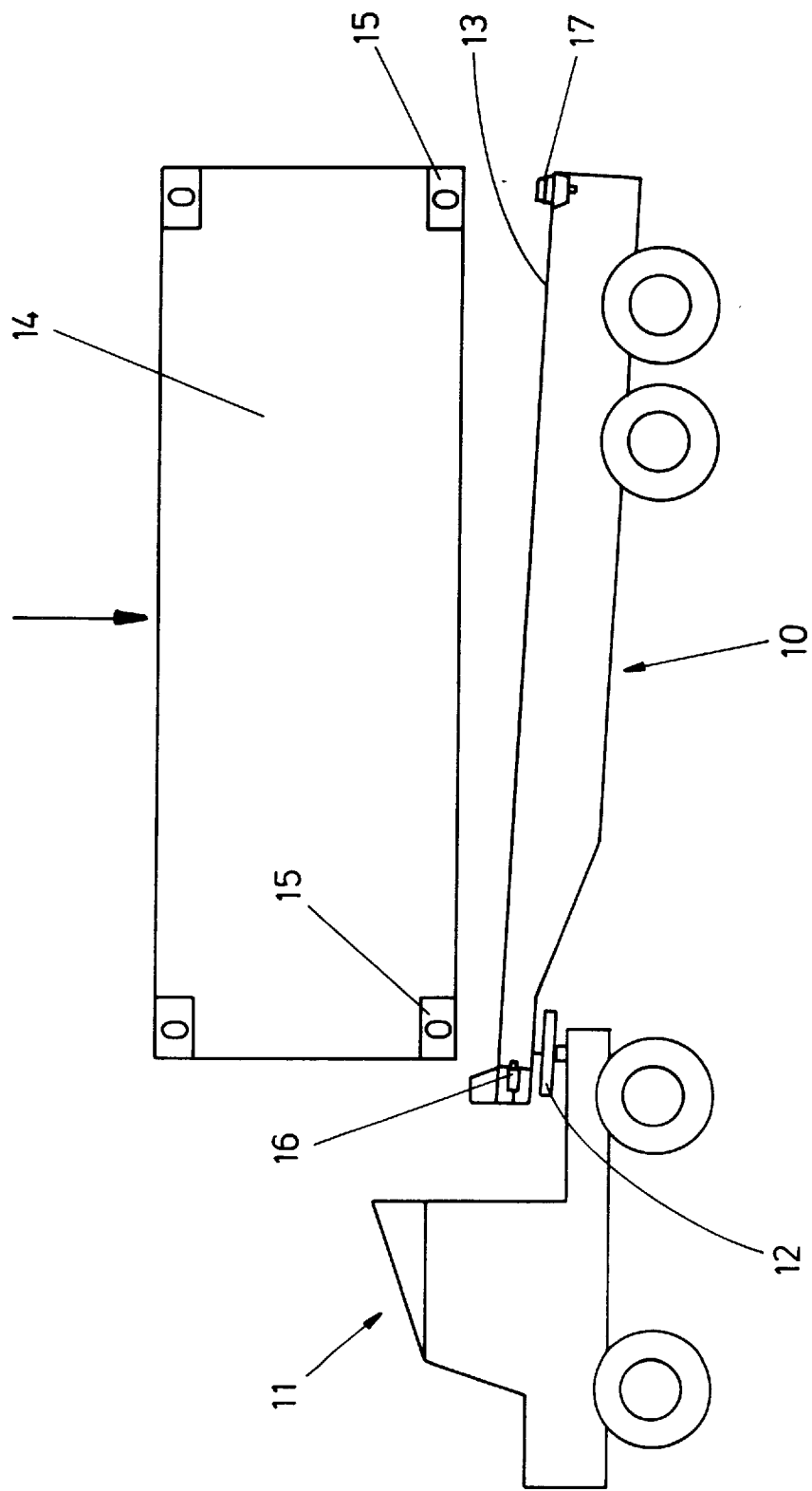
FIG. 1 is a schematic side view of a trailer vehicle coupled behind a large tractor unit via a fifth wheel coupling, and having a loading platform which incorporates a locking system according to the invention, and on which a freight container can be mounted.

Referring first to FIG. 1 of the drawings, a preferred embodiment of the invention will be described, by way of example only, with reference to a trailer vehicle 10 which is mounted on, and towed behind a large tractor unit 11 via a fifth wheel coupling 12. Fifth wheel couplings will be well known to those of ordinary skill in the art, and any suitable pivotal mounting may be provided, to which the forward end of the trailer vehicle 10 can be coupled.

The vehicle 10 has a loading platform 13 and onto which a freight container 14 can be loaded, as shown schematically in FIG. 1. The trailer vehicle 10 and the container 14 have cooperative locking and mounting components, namely a locking part formed by a forward pair and a rearward pair of locking devices, and a mounting part formed by mounting blocks cooperable each with a respective one of the locking devices. In the illustrated embodiment, the locking part i.e. the forward and rearward pair of locking devices, is mounted on the platform 13, and the mounting part, in the form of four corner fittings 15, is provided on the container 14. The construction of "corner fittings" will be well-known to those of ordinary skill in the art, and need not be described in detail herein. They comprise robust mounting blocks, into which can engage, in shear and tensile resistant manner, suitable locking devices, which clamp the container firmly down onto the loading platform 13.

The locking part of the system is, as mentioned above, mounted on the loading platform 13, and comprises a forward pair of locking devices, one of which is shown schematically by reference 16 in FIG. 1, and a rear pair of locking devices, one of which is shown by reference 17. The locking devices forming the rear pair 17 are shown only schematically, and may comprise any suitable known twistlok or other type of locking devices (having a locking head which is rotatable between locking and unlocking positions), and including a semiautomatic locking device of the type disclosed in more detail in WO96/00180, which is incorporated herein by specific reference.

The present invention is primarily concerned with the design and arrangement of the locking devices of the forward pair, and which will now be described in more detail below.

Figure 2:
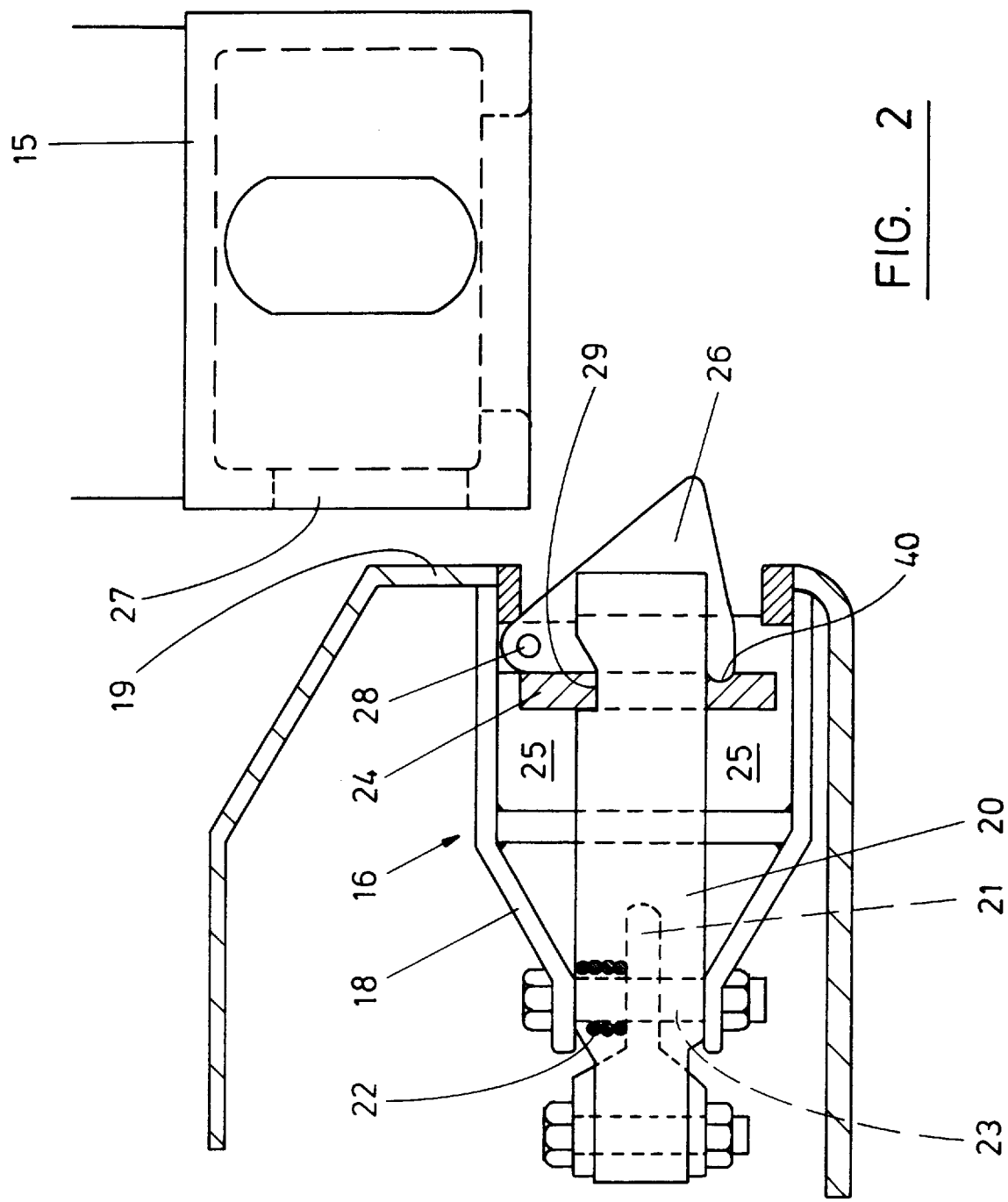
FIG. 2 is a detail enlarged view showing the cooperation, during loading movement of the container, between a forward mounting block or corner fitting of the container and one of a pair of forwardly mounted locking devices in the form of linearly moveable bolts.
Figure 3:
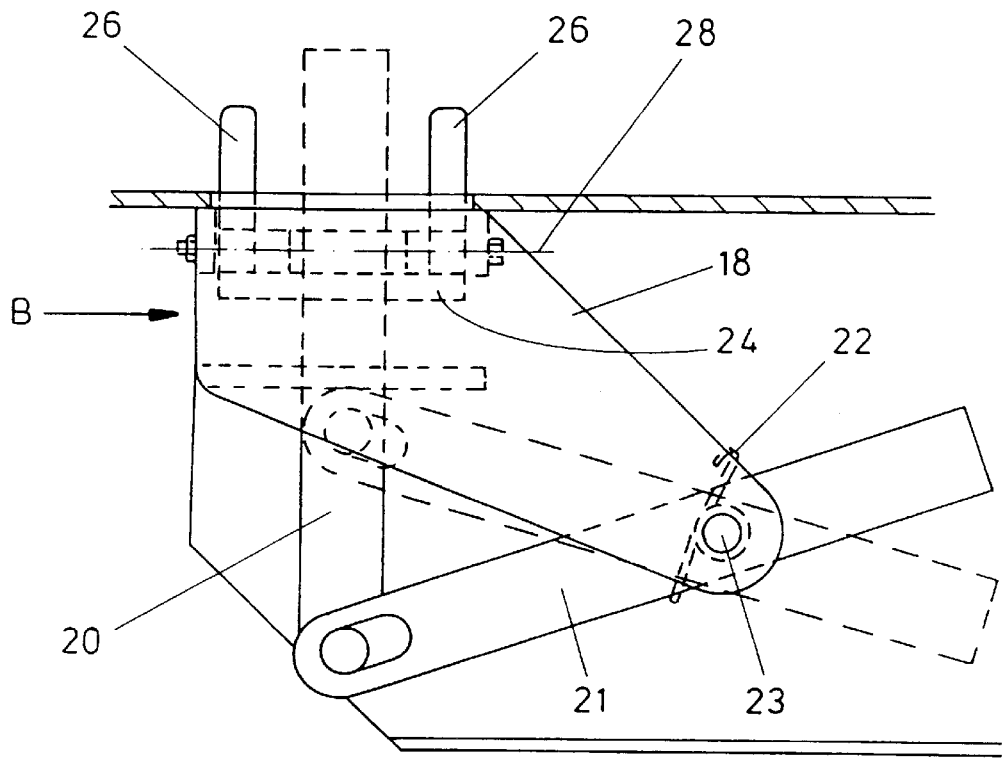
FIG. 3 is a plan view of the locking system shown in FIG. 2.

Each locking device 16 comprises a robust mounting housing 18 which is securely anchored in a low front wall 19 at the front end of the platform 13, and in which a locking bolt 20 is mounted for linear movement between an extended locking position, and a withdrawn unlocking position. FIG. 2 shows the bolt 20 in the withdrawn position, ready to receive container 14 as it carries out loading movement onto the platform 13.

An actuator is coupled with the bolt 20 and takes the form of manually operated lever arm 21 in the illustrated embodiment. The lever arm 21 can be operated in order to move the bolt from the locking position (see e.g. FIG. 5) to the unlocking position, as shown in FIG. 2, when it is required to unload a container from the platform 13.

Means is provided to bias the bolt 20 towards the locking position, and this may take any convenient form, including resilient means, such as a torsion spring 22 which surrounds pivot 23 on which lever arm 21 is mounted.

A latch is mounted in the housing 18, and takes the form of a latch plate 24 which is capable of floating within chamber 25 defined within the housing 18, in order to latch the bolt 20 in the withdrawn position when required, and also to permit linear movement of the bolt when required to and from its locking position.

A cam arrangement is mounted on the housing 1, and takes the form of a pair of cam plates 26, arranged one either side of the bolt 20, and the cam arrangement is moveable between an actuatable position in which it projects from the housing (see FIG. 2) so as to be in the path of loading movement of the container 14 when the latter is being loaded onto the platform 13, and to an at least partly withdrawn position relative to the housing 18 to which it is moved when engaged during the loading movement of the container.

Figure 6:
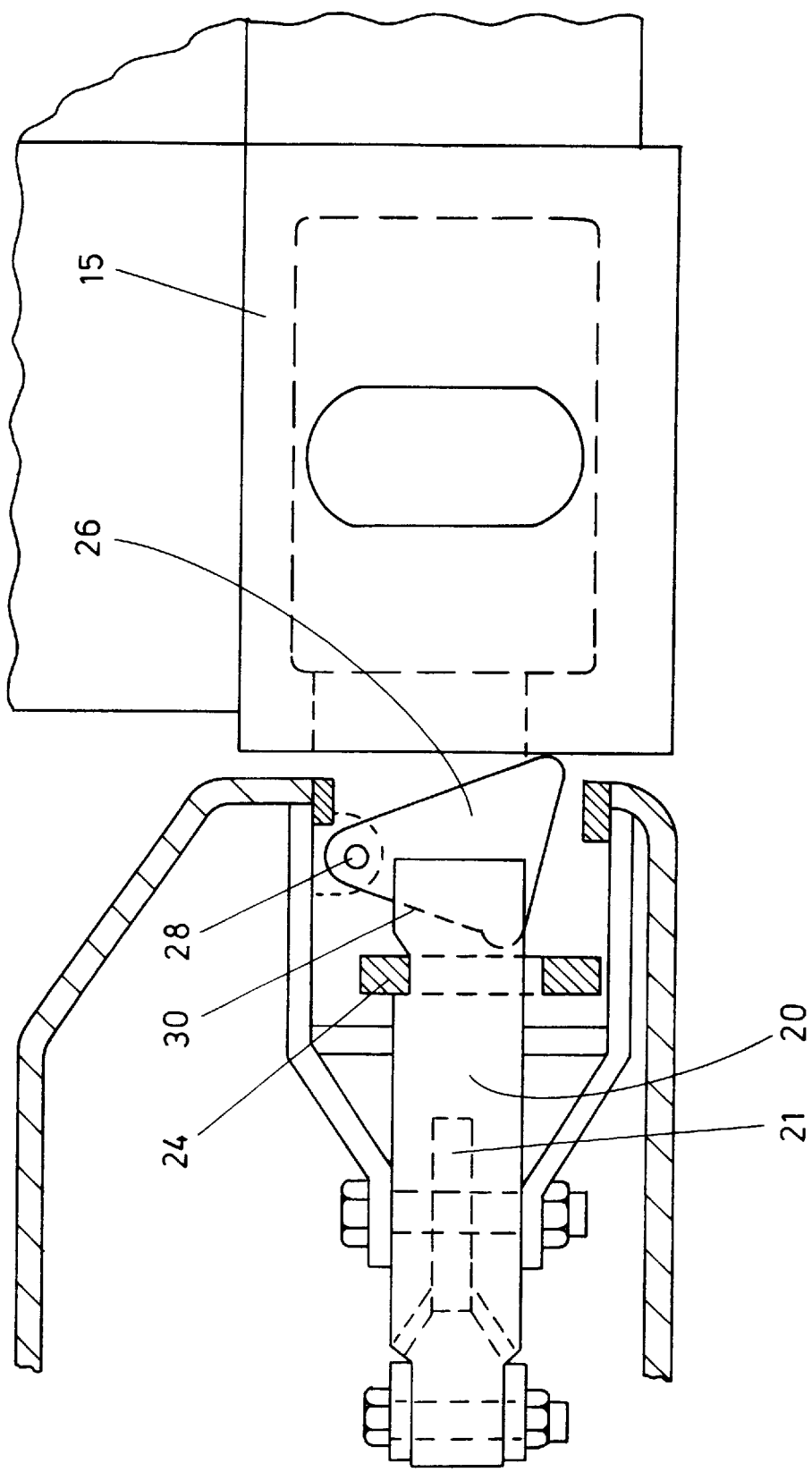
FIG. 6 is a view, similar to FIG. 5, but showing the locking system after manual actuation to a withdrawn unlocking position, in which it is retained, and ready to allow unloading of the container.

FIG. 2 shows corner fitting 15 as it is being moved downwardly to the loading position, and it will be clear that the cam plates 26 lie in this path of loading movement, so as to be automatically actuated in order to move to the position shown in FIG. 6, in which the corner fitting 15 is securely seated in its correct loading position.

Evidently, this actuation of the cam arrangement could also take place if the loading movement of the container 14 comprises horizontal sliding movement to the forward position, or in which its loading movement includes a horizontal component of motion.

During the loading movement of the container 14, the rear corner fittings 15 are brought into engagement with the rear locking devices 17, and the loading movement of the forward end of the container 14 automatically actuates the locking bolts 20 to the locking position, in which they are projected rearwardly under the action of the biasing means through forward apertures 27 of the respective forward corner fittings 15.

The cam plates 26 are freely suspended from upper horizontal pivot 28, and the plates 26 readily pivot in a clockwise direction so as to take up the at least partly withdrawn position within the housing 18, as shown in FIG. 6, and this is all being caused automatically by the loading movement of the container 14.

Figure 4:
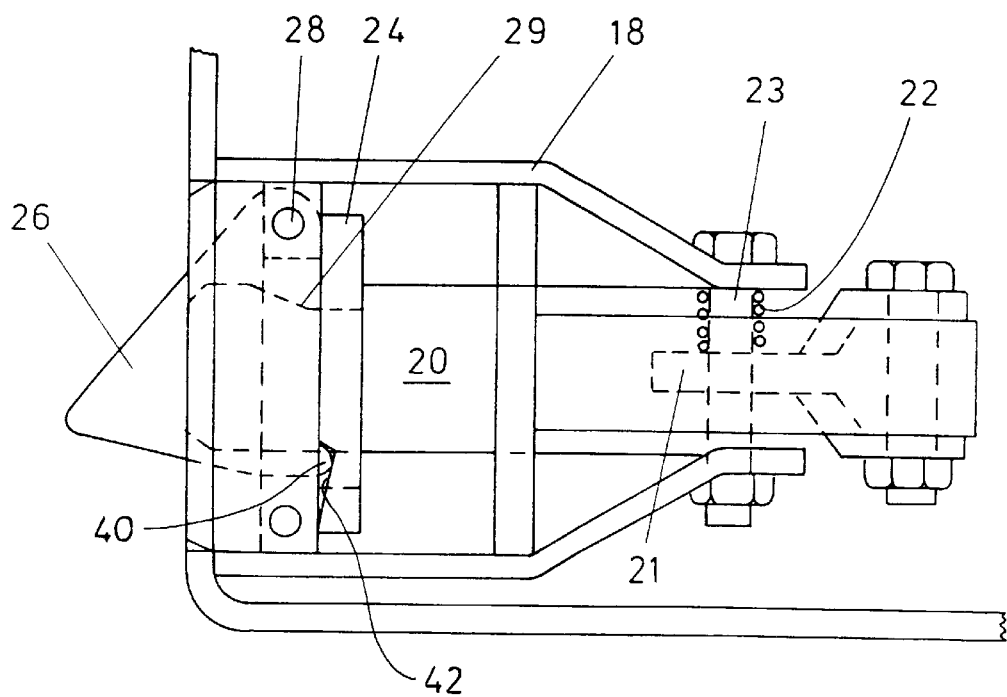
FIG. 4 is a view in a direction of the arrow B in FIG. 3.
Figure 5:
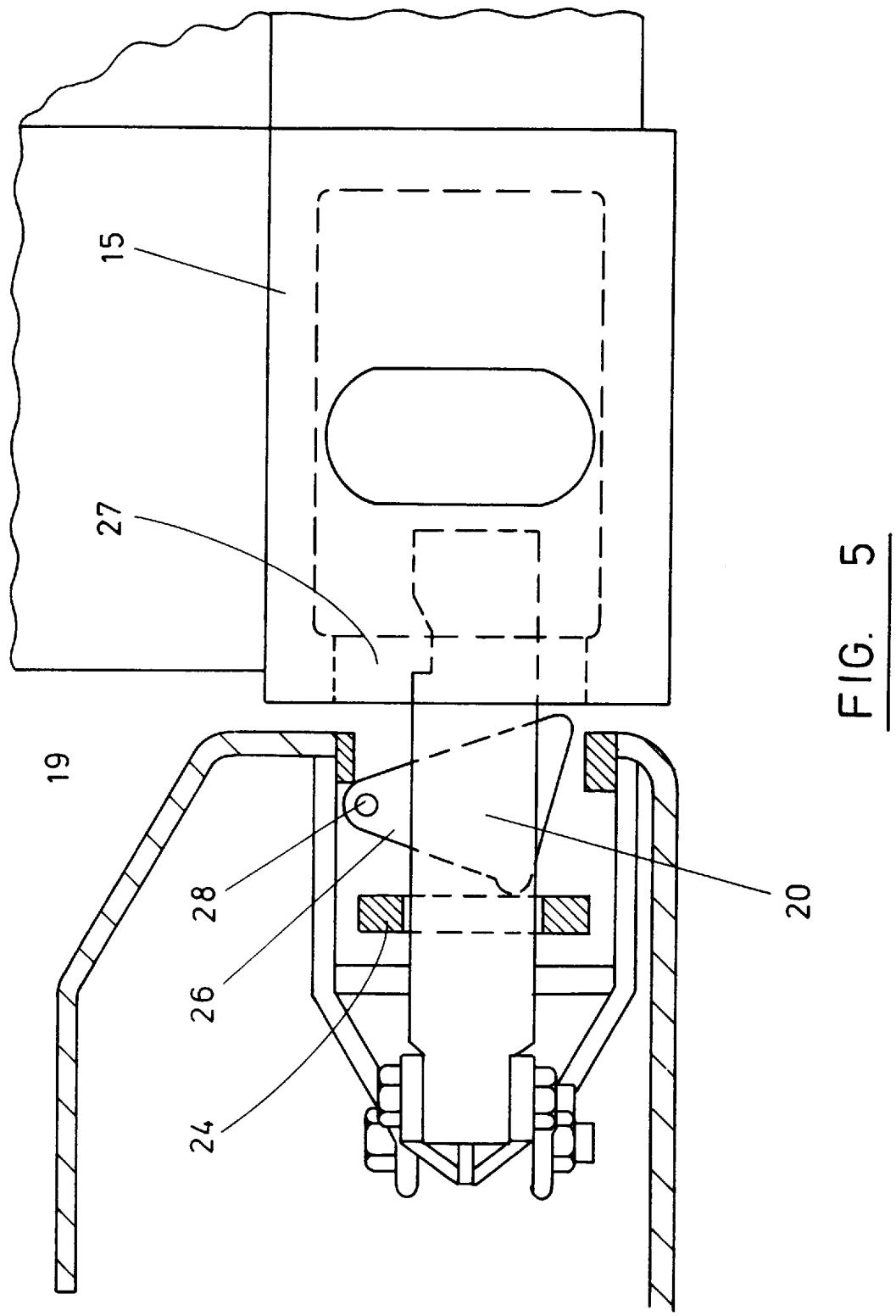
FIG. 5 is a side view, similar to FIG. 2, but showing the locking co-operation between the locking system and the forward corner fitting, after the container has reached the fully loaded position and the consequent actuation of the locking system.

Specifically, as depicted in FIGS. 2 and 4, a small protrusion 40 on each cam plate 26 engages a corresponding recess 42 in latch plate 24. As cam plates 26 pivot clockwise, protrusions 40 push bolt 20 and latch plate 24 slightly backwards and simultaneously lift latch plate 24 up and out of notch 29. As depicted in FIG. 5, this enables bolt 20 to be freely biased into the locking position.

FIG. 5 shows the locking position taken up by the bolt 20, after loading of the container, and in particular shows how the cam plates 26 have lifted the latch plate 24 out of engagement with the bolt 20, so that the latter can then be moved under the action of the spring biasing to the locked position. By contrast, FIG. 6 shows the bolt 20 after withdrawal to its unlocking position, by manual operation of the lever arm 21, but with the cam plates 26 still occupying the withdrawn position in which they are maintained by direct engagement with the corner fitting 15. It should be noted that the spring pressure pushes the latch plate 24 into contact with the cam plates 26, but the latter are maintained in the retracted or withdrawn position by the continuing presence of the container 14 on the loading platform. Therefore, the bolt 20 remains retained in the withdrawn position by engagement of the latch plate 24 in the notch 29. However, as the container 14 is lifted off, during unloading, the spring pressure pushes the bolt 20 through a small distance to the right, (as can be seen by comparing the illustrations in FIGS. 2 and 6), and so that the latch plate 24 moves to a position closely adjacent to facing side 30 of the cam plates 26 (see FIG. 2). This causes the cam plates 26 to pivot through a small angle in an anti-clockwise direction, so as to take up the projecting position shown in FIG. 2, ready to receive a new container to be loaded on the platform.

The illustrated embodiment of shoot bolt type of forward locking devices comprises a simple, but reliable construction, which minimises the risk of damage occurring during loading and unloading of containers.

As shown in the drawings, the preferred embodiment of forward locking devices (17) comprises a shoot bolt assembly which can be supplied as a unit, ie a self contained unit having a housing, bolt, actuator, latch, cam arrangement. However, it is not essential to the invention for the forward shoot bolt assemblies to be manufactured and installed as separate units, and some fabricators may prefer to incorporate shoot bolt type assemblies into the wall structure at the forward end of the loading platform of a trailer vehicle. In such a case, the separate housing (18) can be omitted, and the operating components of the locking device (17) can be suitably mounted into or on the existing wall or other structure, and with necessary additional fabrications secured thereto.

I claim:

1. A locking device for locking a container to a trailer comprising:
   a housing;
   a bolt mounted in the housing for linear movement between an extended locking position and a withdrawn unlocking position;
   an actuator coupled with the bolt and operable in order to move the bolt from the locking position to the unlocking position when it is required to unload the container from the trailer;
   a latch mounted in the housing and being movable between first and second positions, the latch in the first position being arranged for engagement with the bolt so as to retain the bolt in the unlocking position, the latch in the second position being arranged such that the bolt is free to move relative to the latch between the locking and unlocking positions;
   means for biasing the bolt towards the locking position;
   a cam arrangement mounted on the housing and moveable between an actuatable position in which the cam projects from the housing so as to be in the path of loading movement of the container, and an at least partly withdrawn position relative to the housing and to which the cam is moveable when engaged during the loading movement of the container;
   the cam arrangement and the latch being configured whereby a) on movement of the cam from the actuatable position to the at least partly withdrawn position by the loading movement of a container the latch moves to the second position allowing the bolt to move under its biasing to the locking position, b) on subsequent movement of the bolt to its unlocking position while the container is maintained on the trailer, the latch moves to its first position maintaining the bolt in the unlocking position, and c) an unloading the container from the trailer the cam arrangement is biased into the actuatable position by the latch.

2. A locking device as claimed in claim 1, in which the cam arrangement comprises a pair of cam plates, mounted one on each side of the bolt.

3. A locking device as claimed in claim 1, in which the latch comprises a latch plate which is moveable up and down, and linearly within a chamber of the housing, to latch and unlatch the bolt and to allow linear movement of the bolt when latched and unlatched.

4. A locking device for locking a container to a trailer, the locking device comprising:
   a housing;
   a bolt mounted in the housing for linear movement between an extended locking position and a withdrawn unlocking position;
   an actuator coupled with the bolt and operable to move the bolt from the locking position to the unlocking position, the actuator comprising a lever arm pivotally mounted on the housing by a pivot;
   a latch mounted in the housing for engagement with the bolt in order to retain the bolt in the unlocking position when the bolt has been withdrawn from the locking position;
   means for biasing the bolt towards the locking position, the biasing means comprising a torsion spring mounted on the pivot and operative to apply a turning movement to the lever arm so the lever arm is capable of applying a linear actuating force to the bolt; and
   a cam arrangement mounted on the housing and moveable between an actuatable position in which the cam projects from the housing so as to be in the path of the container when the container is loaded onto the trailer, and an at least partly withdrawn position relative to the housing, the cam being movable to the partly withdrawn position when engaged by the container during loading of the container on the trailer;
   the cam arrangement being operatively interconnected to the latch whereby when the cam arrangement is moved from its actuatable position to the at least partly withdrawn position, the latch is disengaged from the bolt allowing the bolt to move under its biasing to the locking position.

5. A locking device comprising:
   a housing;
   a bolt positioned within the housing, the bolt having a notch formed therein and being movable between an extended locking position and a withdrawn unlocking position;

means for biasing the bolt in the extended locking position;

a latch movably disposed within the housing, the latch being configured to rest within the notch of the bolt to retain the bolt in the withdrawn unlocking position; and a cam pivotally mounted to the housing, the cam being movable between an actuating position in which the cam projects from the housing and a withdrawn position, the cam being configured to lift the latch out of the notch of the bolt allowing the bolt to freely advance into the extended locking position when the cam is moved from the actuating position to the withdrawn position.

6. A locking device as recited in claim 5, wherein the latch has a recess and the cam has a protrusion, the protrusion being at least temporarily received within the recess of the latch when the cam is moved from the actuating position to the withdrawn position.

7. A locking device as recited in claim 5, further comprising an actuator coupled with the bolt, the actuator being operable to move the bolt from the extended locking position into the withdrawn unlocking position so that the latch automatically seats within the notch of the bolt.

* * * * *